(12) United States Patent
Yamaguchi et al.

(10) Patent No.: US 7,299,363 B2
(45) Date of Patent: Nov. 20, 2007

(54) METHOD FOR USING SHARED LIBRARY IN TAMPER RESISTANT MICROPROCESSOR

(75) Inventors: Kensaku Yamaguchi, Yokohama (JP); Mikio Hashimoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 737 days.

(21) Appl. No.: 10/608,113

(22) Filed: Jun. 30, 2003

(65) Prior Publication Data

US 2004/0139341 A1 Jul. 15, 2004

(30) Foreign Application Priority Data

Jul. 1, 2002 (JP) .............................. 2002-192422

(51) Int. Cl.
*G06F 12/14* (2006.01)
(52) U.S. Cl. ...................................... 713/189; 713/164
(58) Field of Classification Search ................ 713/164, 713/167, 189, 194, 165, 166
See application file for complete search history.

(56) References Cited

U.S. PATENT DOCUMENTS

| 4,558,176 | A | | 12/1985 | Arnold et al. |
| 5,666,411 | A | | 9/1997 | McCarty |
| 6,044,442 | A | * | 3/2000 | Jesionowski ................ 711/153 |
| 6,385,722 | B1 | * | 5/2002 | Connelly et al. .............. 713/2 |
| 6,405,316 | B1 | * | 6/2002 | Krishnan et al. ........... 713/190 |
| 6,876,996 | B2 | * | 4/2005 | Czajkowski et al. ........... 707/2 |
| 6,925,569 | B2 | * | 8/2005 | Wuidart ...................... 713/193 |
| 2003/0131153 | A1 | * | 7/2003 | Vu .............................. 709/331 |
| 2004/0111720 | A1 | * | 6/2004 | Vertes ........................ 717/164 |
| 2004/0139341 | A1 | | 7/2004 | Yamaguchi et al. |

FOREIGN PATENT DOCUMENTS

JP 11-110193 4/1999

OTHER PUBLICATIONS

D. Lie, et al.,Proceedings of ASPLOS 2000, 10 pages, "Architectural Support for Copy and Tamper Resistant Software", Nov. 2000.
U.S. Appl. No. 11/060,704, filed Feb. 18, 2005, Haruki et al.
U.S. Appl. No. 10/608/113, filed Jun. 30, 2003, Yamaguchi et al.
U.S. Appl. No. 10/948,313, filed Sep. 24, 2004, Hashimoto.
U.S. Appl. No. 10/913,537, filed Aug. 9, 2004. Hashimoto et al.
U.S. Appl. No. 10/608,113, filed Jun. 30, 2003, Yamaguchi et al.
U.S. Appl. No. 10/754,571, filed Jan. 12, 2004, Yamaguchi et al.
U.S. Appl. No. 10/434,082, filed May 9, 2003, Isozaki et al.
David Lie, et al., "Separating Protection and Resource Management in Operating Systems", Stanford University, http://mos.stanford.edu/papers/dl_osdi_02.pdf, May 17, 2002, pp. 1-14.

* cited by examiner

*Primary Examiner*—Matthew B Smithers
(74) *Attorney, Agent, or Firm*—Oblon, Spivak, McClelland, Maier & Neustadt, P.C.

(57) ABSTRACT

In a method for using the shared library in a tamper resistant microprocessor, the execution code of the shared library is protected because the shared library itself is processed as a task which has a single identifier, and the instruction key for encrypting/decrypting the shared library is recorded at a location within the microprocessor corresponding to that identifier.

7 Claims, 11 Drawing Sheets

METHOD FOR USING SHARED LIBRARY IN TAMPER RESISTANT MICROPROCESSOR

BACKGROUND OF THE INVENTION

1. Field of the Invention

The present invention relates to a method for using a shared library in a microprocessor having a function for supporting the multi-task program execution environment and program and data encryption/decryption function so as to realize the protection of secrecy and the prevention of alteration for the execution codes of the programs and the processing target data.

2. Description of the Related Art

In the computer systems of recent years, the open system constructed by combining hardware and software of various makers has been widespread, as in the case of PCs. In the open system, the information on hardware and system program (or operating system (OS)) is publicly disclosed so that it is in principle possible for an end user to modify or alter the system program according to this information In the application program to be executed in such an environment, it is difficult for a provider of the application program to completely protect the program from the analysis and the alteration. The application program is operated under the management of the OS, so that there is no way of escaping from the attack when the OS itself is altered and used as means for attacking.

For this reason, there is a method to encrypt the application program in advance, in order to prevent the analysis of the application program to be operated in the open system. When the program is encrypted, not only the analysis becomes difficult but also the prediction of the operation in the case where the program is altered also becomes difficult so that it is also effective for the prevention of the alteration. However, the encrypted application program cannot be executed as it is by the existing computer, so that there is a need for a microprocessor which can execute the program while decrypting the program. This microprocessor must protect the secrecy of the program on the presumption that the OS may carry out hostile operations against the application program.

A microprocessor that can satisfy these requirements includes one proposed in commonly assigned co-pending U.S. patent application Ser. Nos. 09/781,158 and 09/781,284, and one disclosed in Lie et al., "Architectural Support for Copy and Tamper Resistant Software", Proceedings of ASPLOS-IX 2000, November, 2000. These proposed microprocessors have a function for encrypting not just programs but also information and data to be handled by the programs as a protection against the analysis and the alteration. They also provides the multi-task program execution environment for executing a plurality of programs simultaneously in a pseudo-parallel manner. In the following such a microprocessor will be referred to as a tamper resistant microprocessor.

In the conventionally proposed tamper resistant microprocessor, it is assumed that the application program is operated singly and all the necessary processing can be realized by its execution code alone. A method for sharing the data region in order to realize the cooperative operations by a plurality of programs has also been proposed in commonly assigned co-pending U.S. patent application Ser. No. 10/028,794. However, even in this case, the programs that are carrying out the cooperative operations are mutually independent individual programs.

On the other hand, the current OS often utilizes the shared library. Here, the library is a collection of sub-programs such as a sub-routine (a group of instructions which have a certain function in the program) which constitute the program. The programmer of the application program can rely on the sub-programs provided in the library for a part of functions of the application program, instead of implementing in the application program all the functions necessary for the operation of the application program. The library and the application program can be separately developed and then freely combined later on for use, so that they can make the software development more efficient.

The classic library is linked to the application program at a time of producing the application program, and the sub-programs of the library are distributed integrally with the application program. On the other hand, the shared library that is widely in use today is distributed as a separate file independent from the application program.

In the case of the shared library, the link to the application program is made when the user actually executes the program. Also, this linking operation is carried out with respect to an image of the application program on memory, rather than with respect to the executable object file of the application program. Once the linking between the application program and the shared library is carried out, it becomes possible to use the sub-programs of the shared library by freely calling them up from the application program, similarly as the sub-programs of an ordinary library.

One of the advantages for using the shared library is that the necessary memory region can be reduced. A total size of one application program and the shared library to be used by that application program is always larger than the size in the case of not utilizing the shared library. However, when there are a plurality of application programs which use the same shared library, it suffices to have one copy of the shared library so that the necessary memory region can be reduced overall. This reduction of the necessary memory region is effective for both the secondary memory (external memory device such as disks) on which the distributed file of the application program is stored and the main memory of the computer on which the application program is stored at a time of its execution.

Among the shared libraries, those known as a dynamic link type (dynamic link shared libraries) have a feature that the shared library can be changed without changing the application program. When the dynamic link shared library is used, it is possible to change a part of the functions of the application program or correct errors in the application program, without changing the application program itself, by replacing one shared library with another shared library. Also, in the case where the application program searches the available shared library after the execution starts and loads the shared library found by the search, it is possible to add functions to the application program without changing the application program itself, by separately providing the shared library alone. The shared library designed to be used in this manner is often referred to as a plug-in.

So far there has been no proposition for an architecture that can enable the use of the shared library on the tamper resistant microprocessor described above.

In order to implement the shared library on the tamper resistant microprocessor, there is a need to satisfy the following requirements. Namely, it is required that the routines of the shared library can be called up from the application program, and that data may be passed to the routine at a time of calling up the routine, and data of the processing result can be returned to the called source when the processing returns from the routine.

In addition, in order to maintain the protection function for data, etc. that is provided by the tamper resistant microprocessor effectively functional, there is a need to protect the secrecy of the information to be exchanged between the application program and the shared library from the OS, etc. In the case of exchanging data to be kept secret at a time of calling up the routine, there is a need to authenticate the correspondent in order to check whether it is a trustworthy correspondent or not (Whether the shared library has been replaced with another malicious shared library by the OS, etc. or not). There is also a need to prevent a secret substitution of another routine into the call up target routine after this authentication is finished. In the case where the shared library are to be used simultaneously from a plurality of application programs, the leakage of a secret of one program to another program by the shared library must be prevented.

Also, the shared library must be usable from arbitrary application. In other words, if the shared library is usable only from a specific application program as a result of the authentication, it would be insufficient as the shared library because its use is limited. On the other hand, from a viewpoint of the application program that uses the shared library, it is preferable to be able to confirm that the shared library will not leak data to the others, before giving data to be kept secret to the shared library.

For these reasons, there is a need to provide a mechanism by which the application program can authenticate the shared library.

The operation of the shared library is to receive data from the application program, apply some processing on the data, and return the processing result to the application program. Here, the data received from the application program and the processing result should not be leaked to the third party other than the application program and the shared library. Namely, not only the data exchange must be carried out by applying the encryption, but there is also a need to check that the program to which the processing result corresponding to the received data is going to be returned is the same application program which originally provided the data.

Also, anyone can write an application program that uses the shared library, so that there is a possibility of being used from a malicious application program. Even in such a case, it must be capable of protecting the internal operation of the shared library from the analysis. In other words, it must be capable of preventing the reading of the execution code of the shared library by the application program and the peeping of the intermediate data during the processing of the data given to the shared library by the application program.

BRIEF SUMMARY OF THE INVENTION

It is therefore an object of the present invention to provide a method for using a shared library and a computer program product for such a method, which are capable of enabling the use of the shared library on the tamper resistant microprocessor which has been impossible conventionally, while satisfying the above described requirements and providing the above described advantages.

According to one aspect of the present invention there is provided a method for using a shared library called up from a calling source program in a tamper resistant microprocessor which has a function for decrypting and executing encrypted codes and a table formed by a plurality of regions for storing a plurality of encryption keys corresponding to at least one program and at least one shared library to be called up by the at least one program, the method comprising: creating a task for the shared library; allocating a task identifier to the task; acquiring an instruction key from a header of the shared library; storing the instruction key into a region of the table corresponding to the task identifier allocated to the task for the shared library in the microprocessor; initializing by executing a loader in the shared library; and returning a control to the calling source program via an entry point in the shared library.

According to another aspect of the present invention there is provided a computer program product for causing a tamper resistant microprocessor which has a function for decrypting and executing encrypted codes and a table formed by a plurality of regions for storing a plurality of encryption keys corresponding to at least one program and at least one shared library to be called up by the at least one program, to use a shared library called up from a calling source program, the computer program product comprising: a first computer program code for causing the tamper resistant microprocessor to create a task for the shared library; a second computer program code for causing the tamper resistant microprocessor to allocate a task identifier to the task; a third computer program code for causing the tamper resistant microprocessor to acquire an instruction key from a header of the shared library; a fourth computer program code for causing the tamper resistant microprocessor to store the instruction key into a region of the table corresponding to the task identifier allocated to the task for the shared library in the microprocessor; a fifth computer program code for causing the tamper resistant microprocessor to initialize by executing a loader in the shared library; and a sixth computer program code for causing the tamper resistant microprocessor to return a control to the calling source program via an entry point in the shared library.

Other features and advantages of the present invention will become apparent from the following description taken in conjunction with the accompanying drawings.

DETAILED DESCRIPTION OF THE INVENTION

Referring now to FIG. 1 to FIG. 11, one embodiment of a method for using a shared library according to the present invention will be described in detail.

Figure 1:
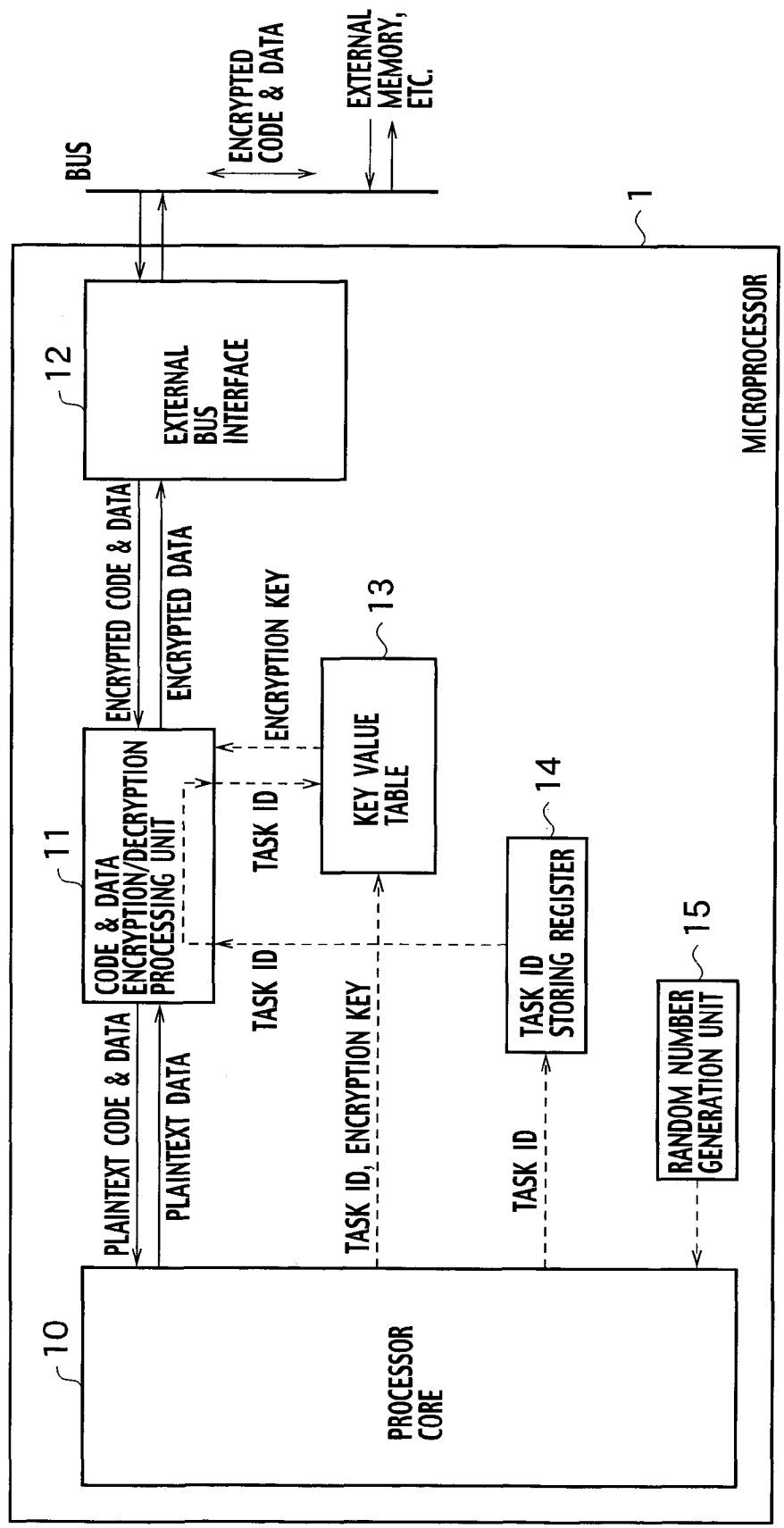
FIG. 1 is a block diagram showing a configuration of a microprocessor in which a shared library is to be used according to one embodiment of the present invention.

FIG. 1 shows a basic hardware configuration of a microprocessor (tamper resistant microprocessor 1 to which the present invention is applied. The microprocessor 1 has a processor core 10, a code and data encryption/decryption processing unit 11, a key value table 13, a task ID storing register 14, a random number generation unit 15, and an external bus interface 12.

The microprocessor 1 to be used as the tamper resistant microprocessor differs significantly from the ordinary microprocessor in that it internally has the code and data encryption/decryption processing unit 11. The execution code and data to be inputted into the processor core 10 are inputted after being decrypted by the code and data encryption/decryption processing unit 11. Also, when the data flows out on the bus from the processor core 10, the data are outputted after being encrypted by the code and data encryption/decryption processing unit 11. The code and data encryption/decryption processing unit 11 uses an encryption key in the encryption processing and the decryption processing. This encryption key is acquired from the key value table 13 inside the same microprocessor 1. Also, the task ID storing register 14 is used in selecting and acquiring the encryption key to be used among those in the key value table 13.

Figure 2:
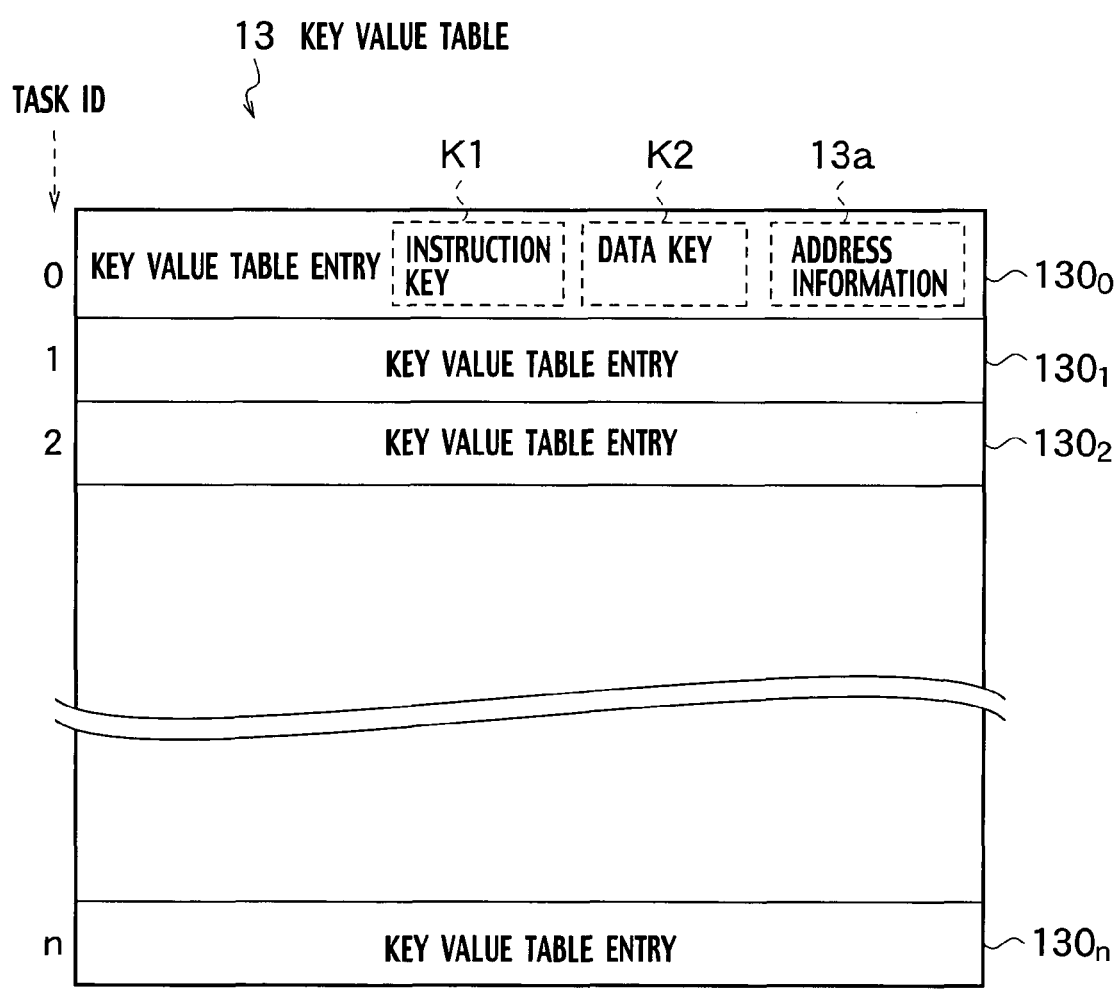
FIG. 2 is a diagram showing a key value table provided inside the microprocessor of FIG. 1.

FIG. 2 shows a configuration of the key value table 13. In the key value table 13, a plurality of key value table entries 130 formed by registers for storing values of the encryption keys are arranged. The key value table entries can be provided as many as the number (n+1) of task IDs ranging from 0 to n as will be described below. The key value table entries 130 are identified each other as $130_0$, $130_1$, $130_2$, ..., $130_n$ for different task IDs. The key value table entry $130_i$ ($0 \leq i \leq 1$) can store an instruction key k1 which is a key for encrypting/decrypting the execution code 32 of the program 3, a data key k2 which is a key for encrypting/decrypting data to be handled by the program 3, and an address information 13a which indicates a memory range to which the instruction key k1 and the data key k2 will be applied.

As a plurality of key value table entries $130_0$, $130_1$, $130_2$, ..., $130_n$ are arranged in the key value table 13, the instruction keys of different programs 3 can be stored into different key value table entries $130_i$ ($0 \leq i \leq 1$). In this way, it is possible to deal with the multi-task operation in which instances (processes or the like) of a plurality of programs encrypted by different encryption keys are operated in a pseudo-parallel manner.

The task ID storing register 14 is a register for storing one task ID. The task ID storing register 14 will be used in identifying the task that is currently executed by the microprocessor 1 in multi-task operation, in which multiple tasks are operated in a pseudo-parallel manner. A task may be an instance of a single-threaded process, or one thread within a multi-threaded process, or an instance of a shared library that is being called by another task.

The random number generation unit 15 provides a different random number with respect to each occasion of reading from the processor core 10. This random number generation unit 15 can be used in generating a random number that is necessary for the key by which the program carries out the encryption or for the authentication.

The software operated on the microprocessor to which the present invention is applied comprises a system software (OS), the application program 3 (hereafter simply referred to as program), and the shared library 4.

In the following, the configurations of the program 3 and the shared library 4 will be described.

Figure 3:
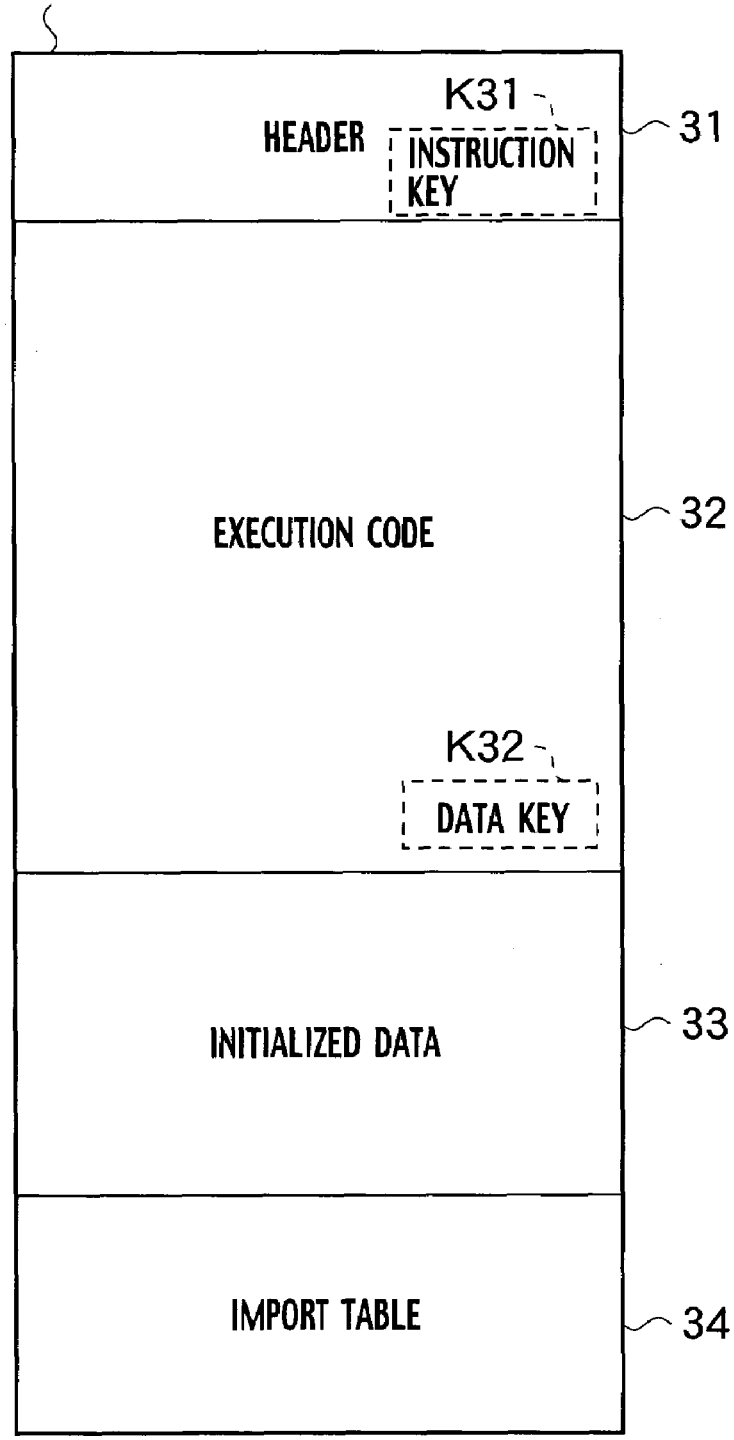
FIG. 3 is a diagram showing an application program used in one embodiment of the present invention.

FIG. 3 shows a configuration of the program 3 in this embodiment. The program 3 is formed by a header 31, an execution code 32, an initialized data 33, and an import table 34. The header 31 contains the instruction key K31 for decrypting the execution code 32 of the program 3. The import table 34 specifies the shared library 4 to be used by the program 3 and symbols contained in the shared library 4 (symbols are identifiers for identifying sub-routines or the like contained in the shared library as will be described below), which are information necessary in loading the shared library 4.

Figure 4:
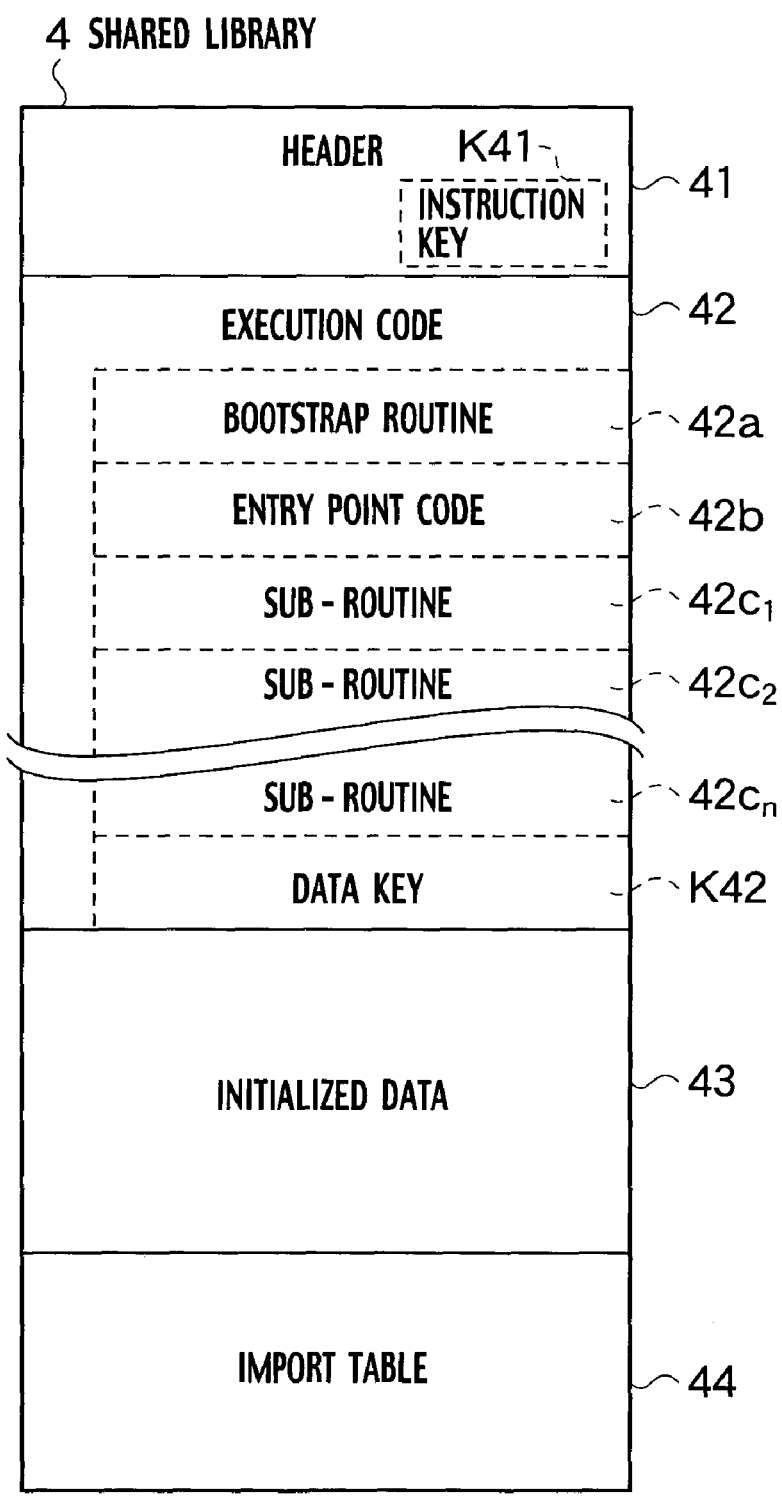
FIG. 4 is a diagram showing a shared library used in one embodiment of the present invention.

FIG. 4 shows a configuration of the shared library 4 in this embodiment. The shared library 4 is formed by a header 41, an execution code 42, an initialized data 43, and an import table 44, similarly as the program 3. The import table 44 of the shared library 4 contains information necessary in the case where this shared library 4 itself uses another shared library. The execution code 42 of the shared library 4 is formed by a bootstrap routine 42a, an entry point code 42b, and a number of sub-routines 42c having respective functions. In FIG. 4, a plurality of sub-routines are distinguished by a subscript i ($1 \leq i \leq n$) as $42c_1$, $42c_2$, ..., $42c_n$.

The bootstrap routine (loader) 42a is used in carrying out the processing necessary when the shared library 4 is loaded by the calling source program 3. The entry point code 42b indicates an entry point of the shared library 4 with respect to the program 3 which will be a call up target when the shared library 4 is to be used from the calling source program 3. The other sub-routines $42c_i$ ($1 \leq i \leq n$) of the shared library 4 are codes implementing functions to be actually used by the program 3. Each sub-routines $42c_i$ ($1 \leq i \leq n$) of the shared library 4 is assigned with an identifier for identifying it in the shared library 4.

Also, the execution code 42 of the shared library 4 contains the data key K42 for encrypting data to be used in carrying out the requested processing, when the shared library 4 carries out a processing according to the call from the program 3 as will be described below.

(Start of the Task)

Figure 5:
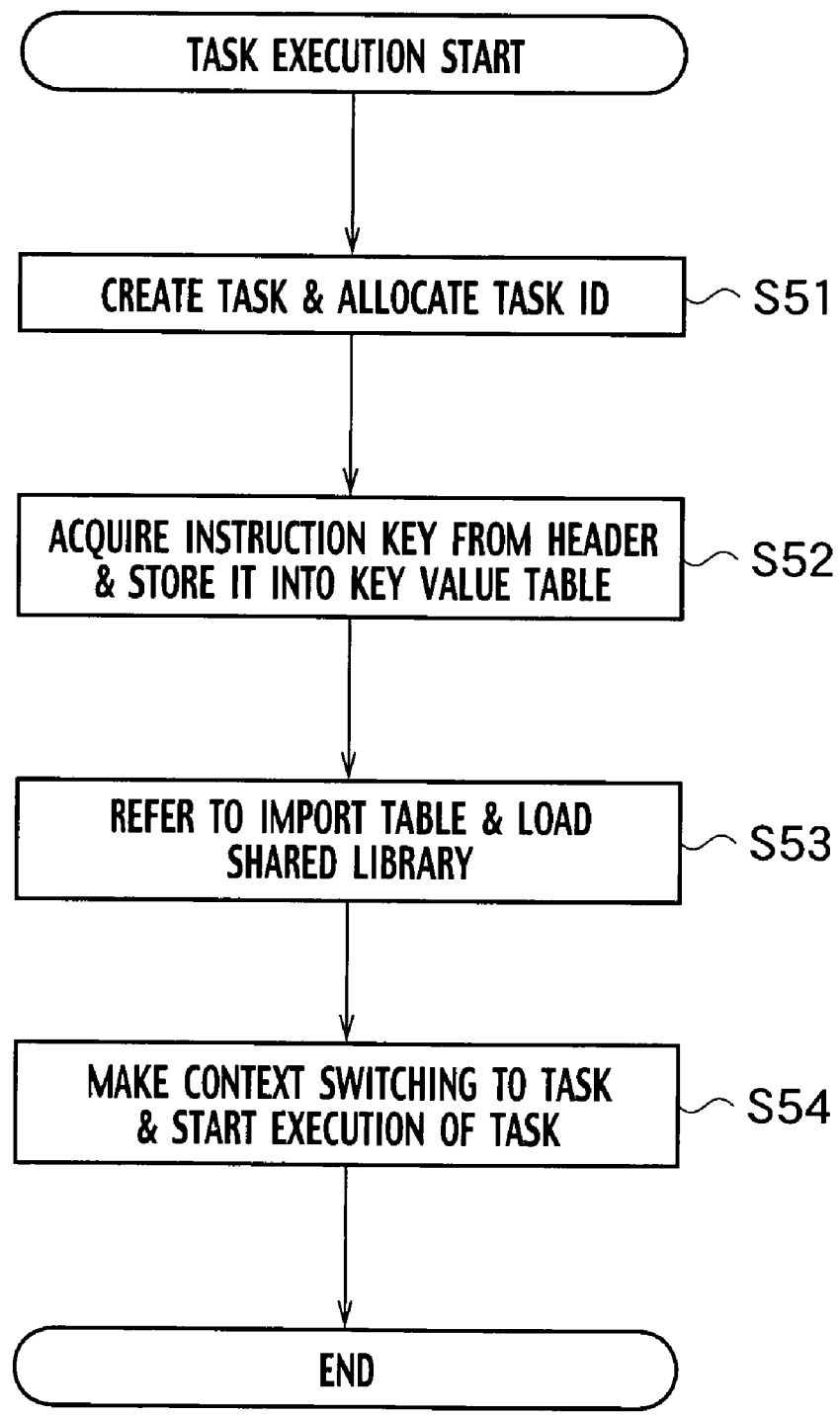
FIG. 5 is a flow chart showing a procedure for task execution start according to one embodiment of the present invention.

Next, with reference to FIG. 5, a procedure by which the OS starts the execution of the task in response to a request for executing the program from the user or a request for creating a new process or a new thread from the existing process will be described.

First, the OS creates the task (step S51). This includes a securing of a memory region and a creation of a data structure for the purpose of managing the task. The OS also carries out the allocation of a task ID to the new task.

Next, the OS acquires the instruction key K31 from the header 31 of the program 3, and stores the instruction key K31 into the key value table entry $130_i$ ($0 \leq i \leq 1$) corresponding to the task ID allocated earlier (step S52).

Also, the OS refers to the import table 34 of the program 3 and loads each shared library 4 described therein by using a mechanism to be described below (step S53). Any number of shared libraries 4 may be described in the import table 34. Consequently, the OS carries out the loading operation separately for each shared library 4 described in the import table 34. Note that the shared library 4 may be loaded in response to a request from the task after the task is started, instead of loading the shared library 4 before the task starts.

When the loading of all the requested shared libraries 4 is completed, the OS carries out the switching of the context to the new task (here the context is data in which the processing state and the environment of the process are described), and starts the execution of the task (step S54). At a time of this task switching, the task ID of the program is stored into the task ID storing register 14.

In the tamper resistant microprocessor 1, the execution code 32 of the program is executed as follows. When the external bus interface acquires the instruction code from the external memory, the code and data encryption/decryption processing unit 11 refers to the content of the key value table 13 corresponding to the task ID stored in the task ID storing register 14, and decrypts the execution code 32 by using the instruction key K31 of the program 3 stored there. Then, the decrypted execution code 32 is given to the processor core 10 and executed there.

(Loading of the Shared Library)

Figure 6:
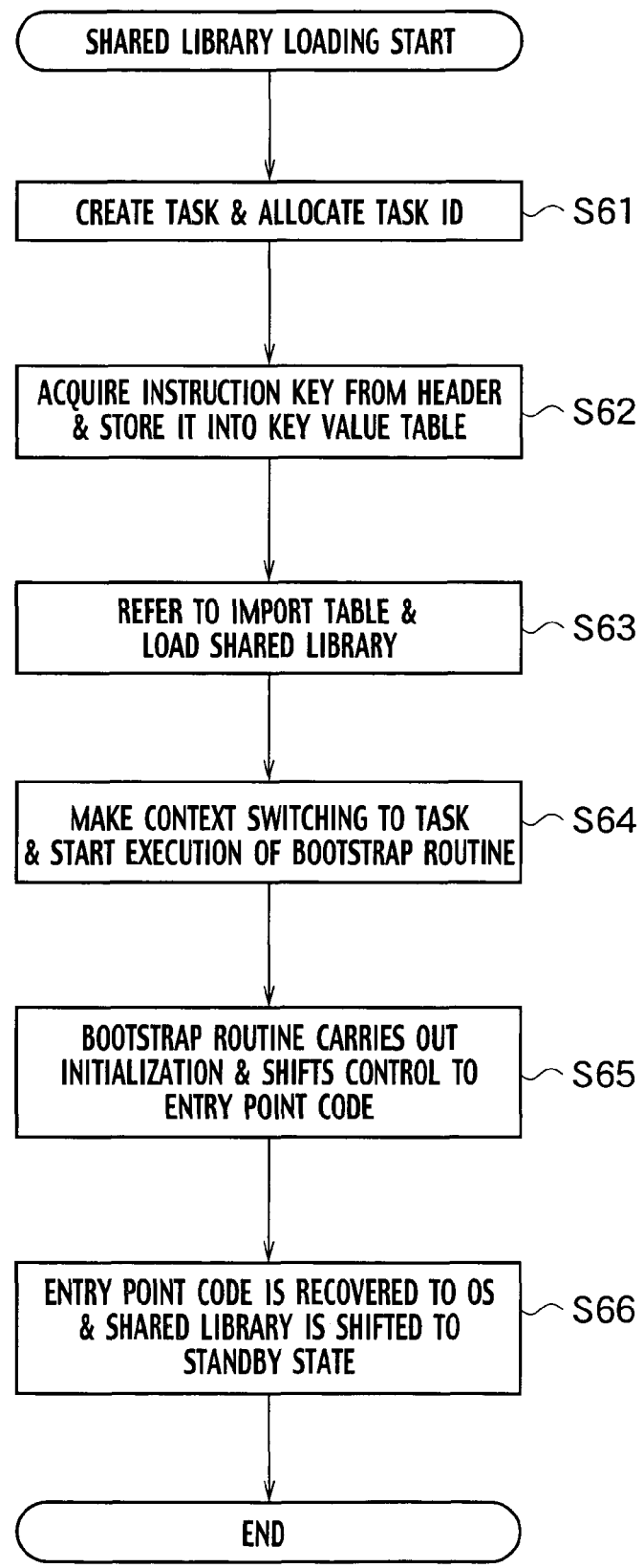
FIG. 6 is a flow chart showing a procedure for shared library loading according to one embodiment of the present invention.

FIG. 6 shows a procedure by which the OS loads the shared library. The ordinary microprocessor does not create another task for the shared library separately from the calling source program. However, the tamper resistant microprocessor 1 creates another task for the shared library 4, in order to account for the security in the case where the program 3 or the shared library 4 happens to be malicious. For this reason, the first operation to be carried out by the OS at a time of loading the shared library 4 is the creation of a task and the allocation of the task ID to the new task (step S61).

Next, the OS acquires the instruction key K41 from the header 41 of the shared library 4, and stores the instruction key K41 into the key value table entry $130_i$ ($0 \leq i \leq 1$) corresponding to the task ID allocated earlier (step S62). By this step, it becomes possible for the microprocessor 1 to decrypt the shared library 4 that is encrypted by using the instruction key K41 in advance, and the different instruction keys K41 are stored into different key value table entries $130_i$ ($0 \leq i \leq 1$). Consequently, even when a plurality of the shared libraries 4 exist, it becomes possible to identify them so that it is secure.

Also, the OS refers to the import table 44 of the shared library 4 according to the need, and loads the other shared library 4 described therein (step S63). The procedure of this loading is the same as the procedure in the case of loading the shared library 4 according to the import table 34 of the program 3.

Next, the OS executes the bootstrap routine (loader) 42a of the shared library 4 (step S64). The bootstrap routine 42a carries out the necessary initialization processing, and then gives the control to the entry point code 42b (step S65). Then, the entry point code 42b returns the control to the OS. When the control is returned to the OS, the shared library 4 is shifted into a standby state (step S66).

Note that, even in the case where the shared library 4 to be loaded is currently used by the other task already in a process of its execution, the loading of the shared library 4 is carried out at each occasion for each calling source task. As a result, as many task IDs as the number of calling source tasks are allocated with respect to the same shared library 4. Here the execution code 42 of the shared library 4 can be loaded into the memory only once even when there are a plurality of calling source tasks, by utilizing the mechanism of the virtual memory of the microprocessor 1 and the OS.

(Call Up of the Sub-Routine in the Shared Library)

Figure 7:
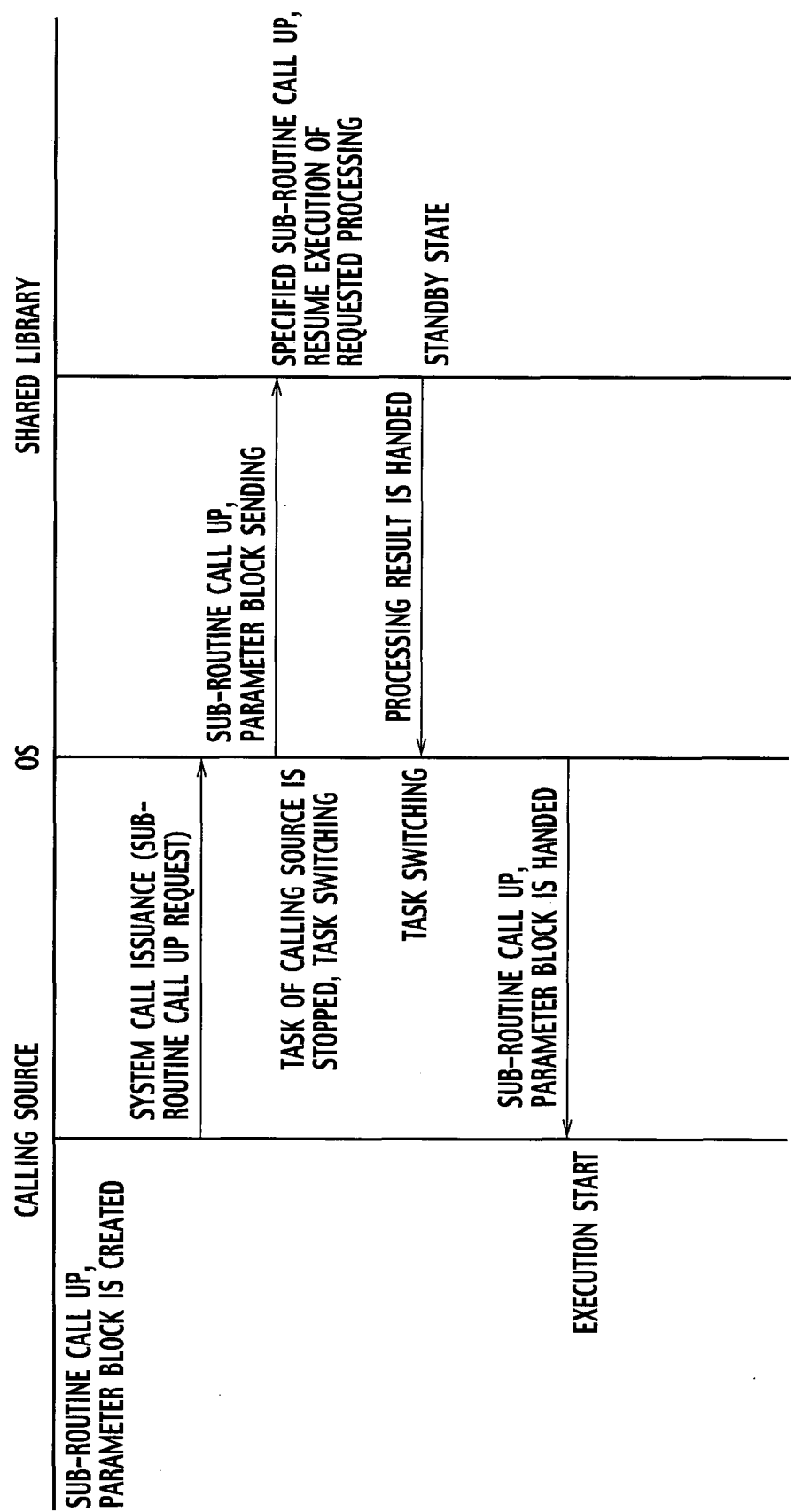
FIG. 7 is a sequence chart showing a procedure for calling up a sub-routine of a shared library according to one embodiment of the present invention.

When there is a need to call up the sub-routine $42c$ ($1 \leq i \leq n$) of the shared library 4 in a middle of the execution of the task, the processing for calling up the sub-routine $42c_1$ ($1 \leq i \leq n$) is carried out according to a sequence shown in FIG. 7.

Figure 8:
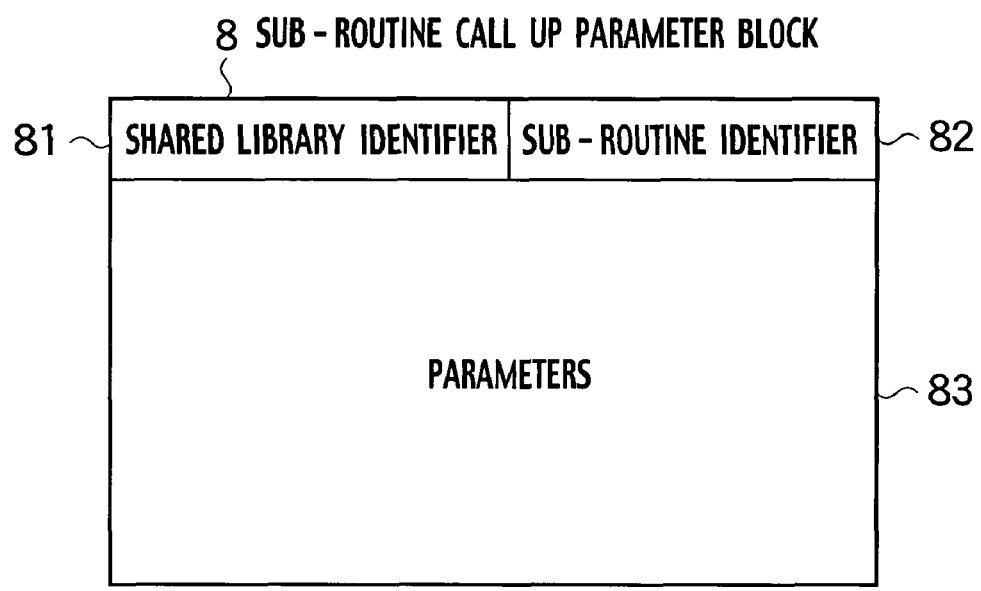
FIG. 8 is a diagram showing a sub-routine call up parameter block according to one embodiment of the present invention.

FIG. 8 shows a structure of a sub-routine call up parameter block 8. The calling source task stores a shared library identifier 81 of the call up target shared library 4, a subroutine identifier 82 of the sub-routine $42c_i$ ($1 \leq i \leq n$) to be called up, and parameters 83 to be given to the sub-routine $42c$; ($1 \leq i \leq n$), into the sub-routine call up parameter block 8. After producing the sub-routine call up parameter block 8, the calling source task gives the sub-routine call up parameter block 8 and makes a request for the sub-routine call up to the OS, by using a system call.

Upon receiving this request, the OS stops the calling source task, selects the task of the call up target shared library 4 by referring to the shared library identifier 81 of the sub-routine call up parameter block 8, and carries out the switching of the task to that shared library 4. At this point, the sub-routine call up parameter block 8 is given to the task of the shared library 4. When the switching of the task to the shared library 4 is carried out, the task ID of the shared library 4 is stored into the task ID storing register 14. Then, the execution of the entry point code 42b of the shared library 4 that has been in the standby state until then is resumed.

The procedure for executing the encrypted execution code 42 of the shared library 4 is the same as the procedure for executing the program execution code 32 described above.

When the execution is resumed, the entry point code 42b of the shared library 4 refers to the content of the sub-routine call up parameter block 8, and calls up the sub-routine $42c_i$ ($1 \leq i \leq n$) corresponding to the sub-routine identifier 81 specified therein. The called up sub-routine $42c_1$ ($1 \leq i \leq n$) refers to the parameters 83 in the sub-routine call up parameter block 8, and carries out the requested processing. The data to be returned as the processing result is stored into the sub-routine call up parameter block 8, and when the processing is completed, the processing returns to the entry point code 42b and then to the OS from there. When the processing returns to the OS, the shared library 4 is set back to the standby state, and the OS returns the sub-routine call up parameter block 8 to the calling source task and resumes the execution of the calling source task.

(Multi-Thread Operation)

In the case where the program 3 that is the calling source of the shared library 4 carries out the multi-thread operation, a plurality of threads cannot use the task of the shared library 4 simultaneously.

For this reason, when the calling source program 3 requests a creation of a new thread during its execution, the OS carries out the processing for loading once again for all the shared libraries 4 used by the calling source program 3. As a result, each shared library 4 is allocated with as many task IDs as the number of threads of the respective calling source program 3. When the call up of the sub-routine $42c_i$ ($1 \leq i \leq n$) of the shared library 4 is requested from the thread, the OS selects an unused task ID that is allocated to that shared library 4, and calls up the sub-routine $42c_i$ ($1 \leq i \leq n$) of the shared library 4 by using this task ID.

Also, in order to reduce the number of task IDs to be used, the OS may carry out the loading of the shared library 4 when there is a shortage of the task IDs at a time of calling up the sub-routine $42c_i$ ($1 \leq i \leq n$), rather than at a time of creating the task.

(Method for Maintaining Secret Data Unique to the Shared Library)

The sub-routine $42c_i$ ($1 \leq i \leq n$) of the shared library 4 maintains the secret data such as a processing progress and a processing method inside the shared library 4 as follows.

The creator of the shared library 4 produces one data key K42 which is an encryption key for encrypting the secret data, and embeds the data key K42 into the execution code 42 (see FIG. 4). A value of this data key K42 is embedded in the execution code 42, and the execution code 42 is encrypted by using the instruction key K41, so that those who do not know the instruction key K41 of the shared library 4 cannot take out the data key K42 from the shared library 4. In order to encrypt the data to be kept secret, a value of this data key K42 and an address of the memory region to be encrypted are stored into the key value table 13. Then, the data to be read/written with respect to the specified memory region is encrypted/decrypted by the code and data encryption/decryption processing unit 11. It is also possible to distribute the data encrypted by using this data key K42 in advance as the initialized data 43 of the shared library 4, such that the sub-routine $42c_i$ ($1 \leq i \leq n$) of the shared library 4 uses it by decrypting it as described above.

After the data are written into the above described memory region and the processing is returned to the calling source once, when there is a need to read this data upon being called up again, it suffices to store the same data key K42 into the key value table 13 again.

However, according to the above described method, as long as the same shared library 4 is used, the data key K42 of the same value will be used every time no matter how many times the shared library 4 is loaded. In other words, When the same data key K42 is used, it becomes possible to store the encrypted data at a time of the one program execution, and write this data into the same memory region at a time of the another program execution, such that the state at a time of the previous execution can be reproduced. If such a re-utilization of the data is allowed, there is a possibility that this fact may be used as a way of attacking against the operation of the shared library 4, so that this fact can be inconvenient in some cases.

In such a case, as described in the commonly assigned co-pending U.S. patent application Ser. No. 09/984,407, it suffices to use the random number generated by the random number generation unit 15 of the microprocessor 1 as the data key K42, by regarding the instruction key and the data key as a key pair. The task of the shared library 4 acquires the random number from the random number generation unit 15 at a time of the execution, and stores this as the data key K42 along with an address of the memory region to be encrypted by using this data key K42, into the key value table 13. When the data key K42 which is generated by the random number generation unit 15 for each task of the shared library 4 is used, the data key K42 of different values will be used for different tasks. Consequently, it becomes impossible to re-utilize the data encrypted by using the data key K42 which is obtained as described above.

The content of the pair of the instruction key K41 and the data key K42 will not be lost even when the processing returns to the calling source, so that when the sub-routine of the shared library 4 is called up again, it is still possible to read the data encrypted by using this data key K42.

(Exchange of Data)

The shared library 4 and its calling source (program or another shared library) can exchange data with each other by using the sub-routine call up parameter block 8 described above. However, the content of this sub-routine call up parameter block 8 is not encrypted, so that there is a possibility for the OS to peep its content.

In order for the shared library 4 and its calling source to exchange the secret data with each other, as proposed in commonly assigned co-pending U.S. patent application Ser. No. 10/028,794, it suffices to carry out the key generation using the Diffie-Hellman key exchange sequence between them. The key generated by the Diffie-Hellman key exchange sequence can be calculated only by two sides which carried out the key exchange. Namely, even the OS which can observe the exchange between them cannot learn the value of this key. In the following, this key will be referred to as a common key ck.

As a memory region for exchanging the secret data, a memory region shared between them is allocated by the memory sharing mechanism provided by the OS. When each of the shared library 4 and the calling source registers the common key into the key value table entry $130_i$ ($0 \leq i \leq 1$) of the respective task, for this memory region, it becomes possible for each of them to decrypt and read the content encrypted and written into this memory region by the other one of them. The memory region prepared in this way will be referred to as a shared encrypted data region in the following.

In the case where there is a need for the shared library 4 and its calling source to authenticate each other as an intended correspondent program 3 or shared library 4, this can be done by attaching a signature according to the public key cryptosystem to a message of the above described key exchange sequence.

For example, in the case where there is a need for the program 3 to authenticate the shared library 4, a pair of the public key and the secret key is given to the shared library 4 in advance, and the public key of the shared library 4 is distributed to the creator of the program 3 in advance. The authentication is realized by attaching the signature based on the secret key of the shared library 4 to the message to be sent by the shared library 4 to the program 3 for the purpose of the key exchange, and verifying this signature at the program 3 by using the public key of the shared library 4.

On the other hand, in the case where there is a need for the shared library 4 to authenticate the program 3, a pair of the public key and the secret key is given to the program 3 in advance, and the public key of the program 3 is distributed to the creator of the shared library 4 in advance. The authentication is realized by attaching the signature based on the secret key of the program 3 to the message to be sent by the program 3 to the shared library 4 for the purpose of the key exchange, and verifying this signature at the shared library 4 by using the public key of the program 3.

Note that the authentication and the key exchange are carried out simultaneously in these schemes, because if they are carried out separately, there would be no method for confirming that the correspondent with whom the authentication is carried out and the correspondent with whom the key exchange is carried out are the same one, so that the pretending of the correspondent by the malicious program would become possible and the authentication could not be done correctly.

(Operation of the Shared Library)

Using the basic operation of each part described above, the operation of the actual shared library 4 according to this embodiment will be described.

Figure 9:
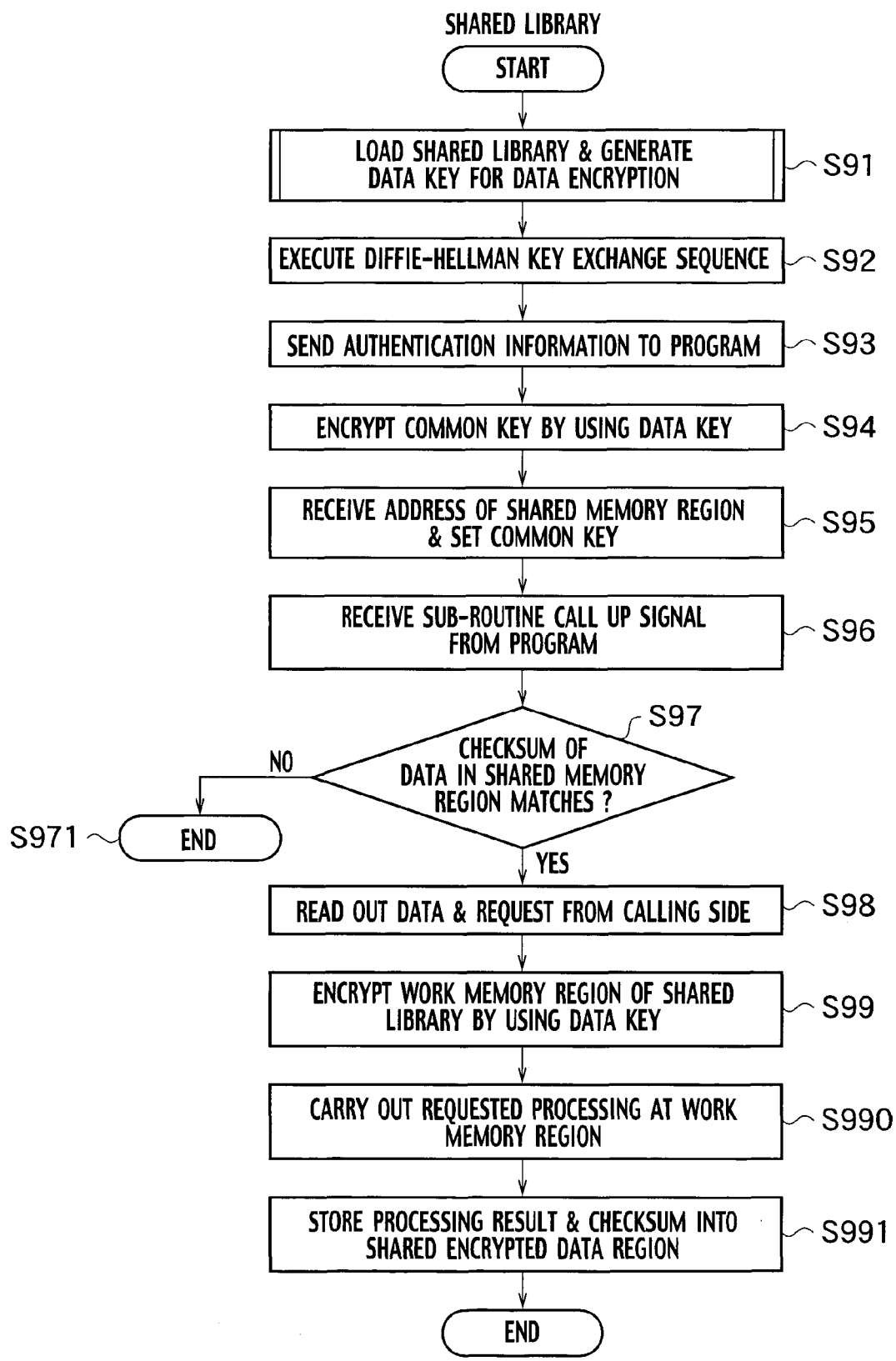
FIG. 9 is a flow chart showing a procedure of a shared library side at a time of using a shared library from a program according to one embodiment of the present invention.
Figure 10:
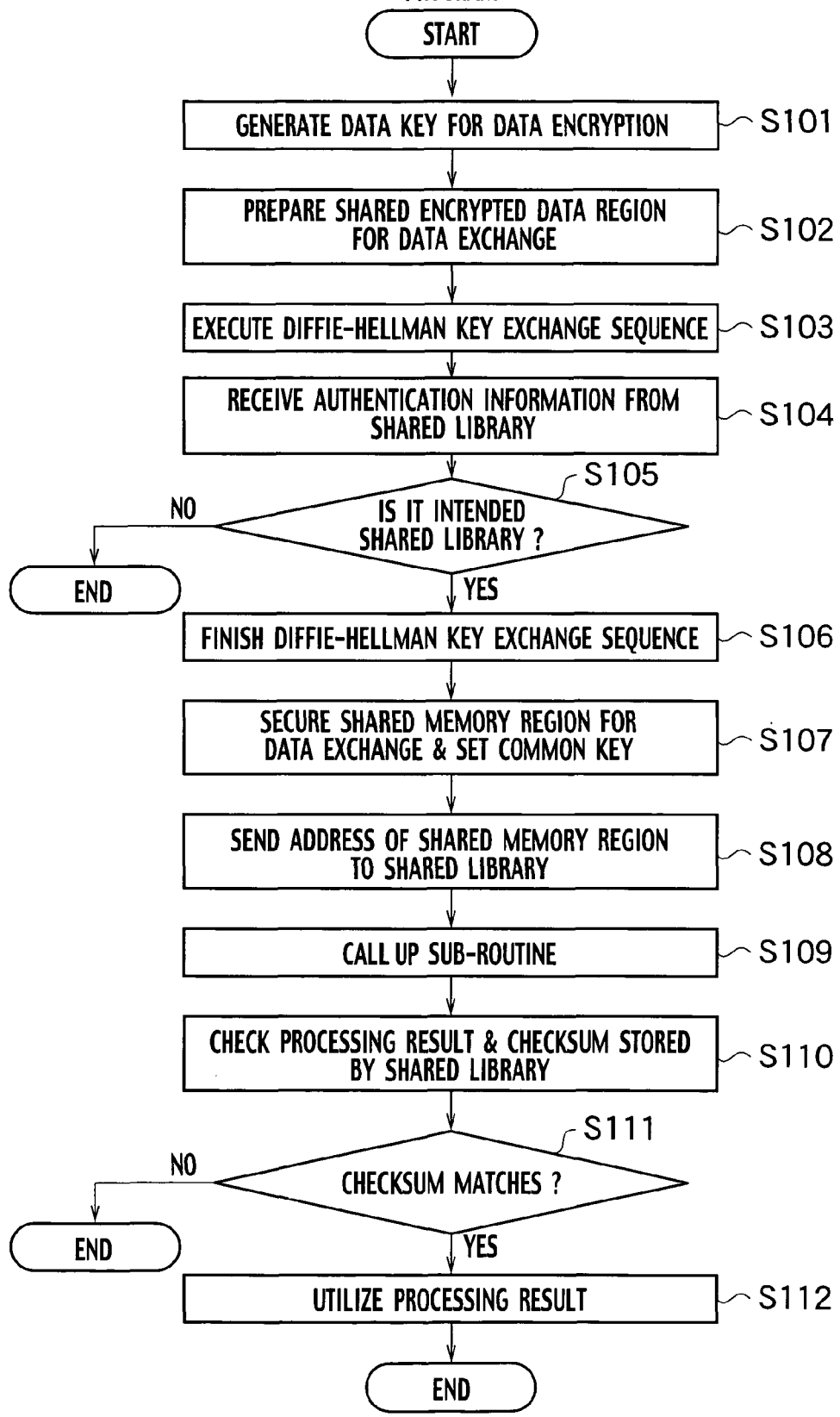
FIG. 10 is a flow chart showing a procedure of a program side at a time of using a shared library from a program according to one embodiment of the present invention.
Figure 11:
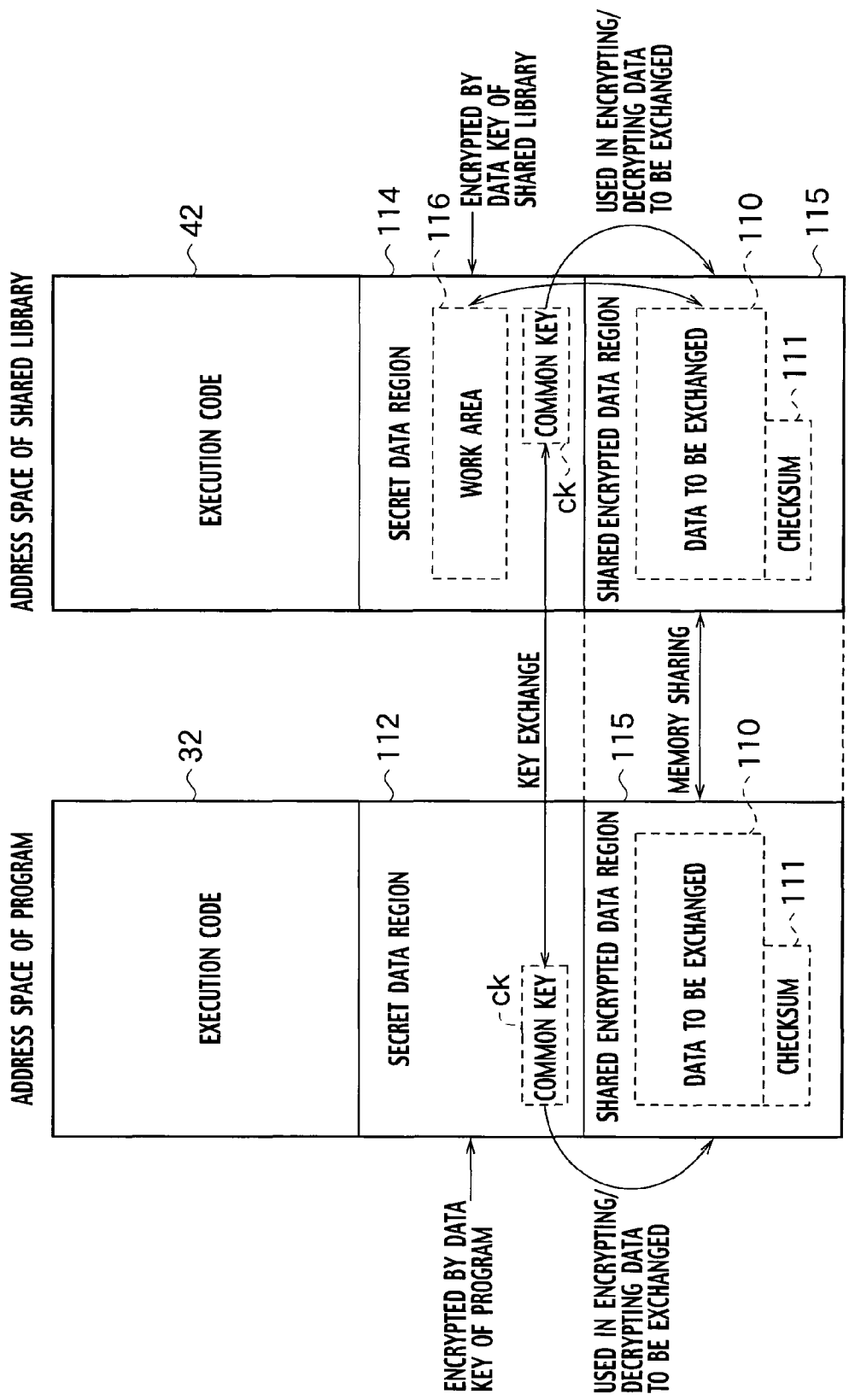
FIG. 11 is a diagram showing an arrangement of memory address spaces of a program and a shared library according to one embodiment of the present invention.

FIG. 9 shows an operation on the shared library 4 side in a procedure by which the program 3 to be described here uses the shared library 4. FIG. 10 shows an operation on the program 3 side at that time. Also, FIG. 11 shows an arrangement of memory address spaces of the program 3 and the shared library 4 at that time.

The shared library 4 to be described here provides a routine for the operation to receive data from the program 3, carry out some processing and return the processing result. Besides that, an assistant routine for carrying out the Diffie-Hellman key exchange sequence is also available from the program 3. Also, it is assumed that the public key and the secret key for the authentication described above are given to the shared library 4 in advance, such that the shared library 4 can be authenticated from the program 3 side. Among them, the public key is distributed along with the shared library 4 such that a programmer who wishes to use this shared library 4 can incorporate this public key into the program to be created by the programmer.

When the program 3 that uses the shared library 4 is executed, the loading of the shared library 4 is carried out, as described above with reference to FIG. 6 (step S91). At a time of the loading, the bootstrap routine 42a (see FIG. 6) of the shared library 4 is executed. At this point, the random number is acquired from the random number generation unit 15 of the microprocessor 1, and the data key K42 is generated by using the random number and stored into the key value table 13 as the data key K42 of the shared library 4. When the loading is completed, the shared library 4 is set in the standby state, and the execution of the program 3 is started. Similarly as the shared library 4, the program 3 also acquires the random number from the random number generation unit 15 in order to encrypt the memory region to be used by the program 3, and the data key K32 is generated and stored into the key value table 13 as the data key K32 of the program 3 (step S101).

Before using the function of the shared library 4, the program 3 prepares the shared encrypted data region 115 for the purpose of the data exchange (step S102). Then, the routine of the shared library 4 for carrying out the Diffie-Hellman key exchange sequence is called up (step S103). In conjunction with this, the shared library 4 side also executes the Diffie-Hellman key exchange sequence (step S92).

At a time of the key exchange, the signature using the secret key for the authentication of the shared library 4 is attached to the message to be sent from the shared library 4 to the program 3, and this authentication information is sent to the program 3 (step S93). The program 3 receives this authentication information from the shared library 4 (step S104). Here, the verification of the signature by using the public key for the authentication of the shared library 4 is carried out (step S105). The key exchange sequence is finished only when this authentication succeeds (step S106). By this verification of the signature, it is possible to confirm that the shared library 4 which is the correspondent with whom the key exchange is carried out is the intended correct shared library 4.

On the program 3 side, the value of the common key ck generated as a result of the key exchange is encrypted by using the data key K32 of the program 3 and written into the secret data region 112 which cannot be read by anything other than the program 3. Similarly, on the shared library 4 side, the above described common key ck is encrypted by using the data key K42 of the shared library 4 and written into the secret data region 114 which cannot be read by anything other than the shared library 4 (step S94). Next, the program 3 makes a request to the OS and secures the shared memory region for the purpose of the data exchange, and sets the common key ck in the key value table 13 such that it is applied to this shared memory region (step S107). Also, the address of this shared memory region is notified to the shared library 4, and the shared library 4 side also sets the common key ck in the key value table 13 such that it is applied to the same shared memory region. On the other hand, the shared library 4 receives the address of this shared memory region and carries out the key setting (step S95). As a result, it becomes possible to use this shared memory region as the shared encrypted data region 115.

When the program 3 actually calls up the sub-routine $42c_i$ ($1 \leq i \leq n$) of the shared library 4 for carrying out the desired processing, the data to be given is entered into the shared encrypted data region 115, and a checksum 111 of this data is calculated and attached to the data. Then, the sub-routine $42c_i$ ($1 \leq i \leq n$) of the shared library 4 is called up (step S109). When this call up signal is received (step S96), the sub-routine $42c_i$ ($1 \leq i \leq n$) of the shared library 4 checks the checksum 111 first (step S97). When the checksum 111 does not match the data content, the processing is finished as an error (step S971). When the checksum matches, the data and the request from the calling source side are read out from the shared encrypted data region 115 next (step S98). In the case where a work memory region is necessary in a process of this processing, the shared library 4 may create and use its own memory region (work region) 116 which is encrypted by using the data key K42 (step S99).

Next, the processing requested for this data is carried out (step S990). When the requested processing is completed, the processing result is stored into the shared encrypted data region 115, the checksum 111 is attached, and the processing returns to the program 3 (step S991). When the processing returns, the program 3 checks the checksum 111 (steps S110, S111). When the checksum matches the data content, the processing is continued by using the returned data (step S112). When the checksum does not match, the error is returned and the processing is finished (step S113).

As long as the procedure for the key exchange and the format of the data exchange are disclosed publicly, anyone can create the program 3 that uses the shared library 4 described above. The fact that this shared library 4 satisfies the requirements regarding the security can be confirmed as follows.

The secrecy of the data given from the program 3 can be guaranteed by the fact that the shared encrypted data region 115 shared between the program 3 and the shared library 4 is encrypted by using the common key ck.

Here, the common key ck used for the encryption is generated by the Diffie-Hellman key exchange. Consequently, the value of the common key ck will not be known by anything other than the program 3 and the shared library 4, unless either one of them intentionally or accidentally disclose this common key ck publicly. Also, the same shared encrypted data region 115 is used at a time of returning the processing result, so that this content can be viewed only by the program 3 and the shared library 4. Even if the other program attempts to read the processing result, the other program does not know the value of the common key ck according to the original Diffie-Hellman key exchange so that the content cannot be decrypted.

It is possible to consider an attack in which the OS fraudulently substitute another program into the calling source program 3, and the program 3 after the substitution steals the processing result returned from the shared library 4, However, the calling source program would be the program 3 of the instruction key K31 which is different before and after the fraudulent substitution so that the contents of the instruction key K31 and the data key K32 that are managed as a pair in the key value table 13 would both be changed, The common key ck is stored in the shared encrypted data region 115 which is encrypted by the data key K32 before the fraudulent substitution, but the value of the data key K32 in the key value table 13 after the fraudulent substitution is changed so that the program 3 after the fraudulent substitution cannot read the common key ck. For this reason, it is in principle impossible for the program 3 after the fraudulent substitution to decrypt the data returned from the shared library 4.

It is also possible to consider another attack in which the erroneous operation is induced as another program 3 alters the content of the data exchanged between the program 3 and the shared library 4 in a course of the data exchange between them. However, the program 3 on the side of altering the data does not know the value of the common key ck used in encrypting this data so that it cannot predict a result of decrypting the altered result. Consequently, the decrypted result of the data becomes random if the alteration is made and the alteration will be detected by the checking of the compatibility according to the checksum 111.

Even in the case where a plurality of tasks are using the same shared library 4 simultaneously, a different task is allocated to the shared library 4 for a different calling source task, so that a respective shared library 4 will use a respectively different data key K42. For this reason, the case of erroneously giving the data received by each shared library 4 from some calling source to another calling source will not occur.

It is impossible for the program 3 that calls up the shared library 4 itself to see the execution code 42 of the shared library 4 because the shared library 4 is encrypted by its own unique instruction key K41. Also, the content of the work memory used in a process of the processing by the shared library 4 uses the secret data region 114 which is encrypted by using the data key K42 that is known only by the shared library 4, so that it is impossible to peep this content.

Note that the shared library 4 described above has the secret key for the authentication in advance. For this reason, the third party who does not know this secret key cannot create the shared library that can be substituted into this shared library 4 at his own will. This goes against the characteristic that the shared library compatible with the existing shared library can be created freely, which is an advantage of the dynamic link shared library. However, this is the limiting factor which is indispensable in guaranteeing the security of the operation of the shared library 4 to the program 3. When a developer other than the original provider of the shared library 4 needs to create a new shared library 4 which is compatible with this shared library 4 in order to add some function, it suffices to ask the provider of the original shared library 4 to confirm the security of the new shared library 4 and ask him to embed the secret key into the new shared library 4.

As described above, according to the present invention, it becomes possible to use the protected shared library from a protected application program operated on the tamper resistant microprocessor. By using the shared library, it becomes possible to improve the program development efficiency and the ability to enhance the function of the program. It is also possible to protect the secrecy of the data such as the processing result, and the processing method inside the encrypted program and the shared library, by enabling the exchange of the secret data and the mutual authentication.

According to the method for using the shared library realized in this way, the execution code of the shared library is protected because the shared library itself is processed as a task which has a single identifier, and the instruction key for encrypting/decrypting the shared library is recorded at a location within the microprocessor corresponding to that identifier.

In such a shared library, the processing result and the data of the processing result are encrypted by using the data key of the shared library when the shared library carries out the processing requested from the program. For this reason, in addition to the encrypting of the code of the shared library itself, it is possible to prevent the leakage to the external of the internal processing method and processing result. Also, it is possible to surely protect the processing content and the processing result within the shared library even in the case where the calling source is changed before and after the processing by the OS or the like, as the checksum matches or nor is checked each other when the request for processing is received and the processing result is returned to the calling source. In addition, it is also possible to use one shared library from a plurality of calling sources because the loading is carried out as many times as the number of the calling sources.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for using a shared library called up from a calling source program in a tamper resistant microprocessor which has a function for decrypting and executing encrypted codes and a table formed by a plurality of regions for storing a plurality of encryption keys corresponding to at least one program and at least one shared library to be called up by the at least one program, the method comprising:

creating a task for the shared library;
allocating a task identifier to the task;
acquiring an instruction key from a header of the shared library;
storing the instruction key into a region of the table corresponding to the task identifier allocated to the task for the shared library in the microprocessor;
initializing by executing a loader in the shared library; and
returning a control to the calling source program via an entry point in the shared library.

2. The method of claim 1, further comprising:
loading another shared library by referring to an import table in the shared library, after storing the instruction key into the table in the microprocessor.

3. The method of claim 1, wherein the initializing step executes as many loaders in the shared library as a number of calling source programs, and the method further comprising:

producing as many data keys as the number of calling source programs for encrypting data to be used by the shared library, before the returning step;
storing the data keys into a region of the table to which the task identifier of the task for the shared library is allocated in the microprocessor, before the returning step;

setting the shared library in a standby state waiting for a call up from the calling source program, after the returning step;

having the shared library authenticated by the calling source program;

receiving an address of a shared memory region produced by the calling source program;

setting the shared memory region as a shared encrypted data region to be used in data exchange between the calling source program and the shared library;

controlling the shared library to receive a signal for calling up a sub-routine in the shared library from the calling source program;

verifying a checksum of data of the calling source program;

carrying out a processing requested from the calling source program when the checksum of the data of the calling source program matches the data; and sending a result of the requested processing by adding the checksum into the shared encrypted data region.

4. The method of claim 3, further comprising:

encrypting a work memory region for carrying out the processing requested from the calling source program by using one of the data keys of the shared library, after the verifying step;

wherein the carrying out step carries out the processing requested from the calling source program in the work memory region encrypted by the encrypting step.

5. The method of claim 3, wherein the authenticating step carries out an authentication by sending to the calling source program an authentication information to which a signature according to a secret key stored in the shared library in advance is attached, and producing a common key to be used between the calling source program and the shared library.

6. The method of claim 5, further comprising:

encrypting the common key by using one of the data keys of the shared library, after the authenticating step; and storing the common key encrypted by the encrypting step into a secret data region of the shared library.

7. The method of claim 1, further comprising:

generating a data key for encrypting a work memory region of the shared library from a random number from a random number generation unit in the microprocessor before the returning step; and setting the shared library in a standby state waiting for a call up from the calling source program, after the returning step.

* * * * *